United States Patent [19]

Bernhard et al.

[11] Patent Number: 5,048,768
[45] Date of Patent: Sep. 17, 1991

[54] CRUSHING OR GRINDING ELEMENT FOR DRUM REFINERS

[75] Inventors: Emmerich Bernhard; Johann Lileg; Johannes Kappel; Dag Bergloff, all of Graz, Austria; Sven-Erik Henriksson, North Vancouver, Canada

[73] Assignee: Maschinenfabrik Andritz Aktiengesellschaft, Graz, Austria

[21] Appl. No.: 498,890

[22] Filed: Mar. 23, 1990

Related U.S. Application Data

[63] Continuation-in-part of Ser. No. 267,605, Nov. 7, 1988, Pat. No. 4,936,518.

[30] Foreign Application Priority Data

Nov. 5, 1987 [AT] Austria ................................ 2925/87

[51] Int. Cl.$^5$ ............................................. B02C 19/00
[52] U.S. Cl. .................................. 241/261.1; 241/295
[58] Field of Search .................. 241/261.2, 261.3, 296, 241/244, 297, 298, 261.1, 295

[56] References Cited

U.S. PATENT DOCUMENTS 4,355,768 10/1982 Johansson ........................ 241/298 X

FOREIGN PATENT DOCUMENTS 2323442 11/1980 Fed. Rep. of Germany ...... 241/244

Primary Examiner—Mark Rosenbaum
Attorney, Agent, or Firm—Panitch, Schwarze, Jacobs & Nadel

[57] ABSTRACT

A grinding element for a drum refiner for the crushing or grinding of fibrous material. The drum refiner includes an engine driven rotor having a generally horizontal rotor axis and at least one material feed. A rotor jacket is positioned on the rotor and has a surface of revolution. The grinding element is attachable to the rotor jacket on the surface of revolution and has a diameter increasing away from the material feed. A housing receives the rotor and rotor jacket therein, and has an opposing inner wall with a corresponding grinding element thereon. The grinding element on the rotor jacket includes a channel spaced from the material feed for the discharge of steam. The channel has one end in fluid communication with the grinding gap and a second end in fluid communication with a bore extending generally normally to the channel. The bore is in fluid communication with a cavity in the housing. The improvement comprises the grinding element on the rotor jacket being generally formed of a segment. The grinding element includes a surface facing the rotor axis and an anchoring projection of hammerhead-like cross section extending from the surface facing the rotor axis. The anchoring projection is engageable in a generally corresponding rotor groove of hammerhead-like cross section in the surface of revolution, such that the segments serves for the discharge of steam and is locked to the rotor jacket.

11 Claims, 5 Drawing Sheets

CRUSHING OR GRINDING ELEMENT FOR DRUM REFINERS

REFERENCE TO RELATED APPLICATIONS

This application is a continuation-in-part of U.S. Pat. No. 4,936,518, issued on June 26, 1990.

FIELD OF THE INVENTION

The present invention relates to an apparatus for the crushing or grinding of wet fibrous material and, more particularly, to a crushing or grinding element for an apparatus for the crushing or grinding of wet fibrous material.

BACKGROUND OF THE INVENTION

This invention relates to an apparatus for the crushing or grinding of fibrous material, in particular fibrous material wet or mixed with water, preferably chips, in particular to drum refiners, with an engine-driven rotor having a preferably horizontal rotary shaft and at least one, in particular at least two, surface(s), conveniently surfaces of revolution, in particular frustoconial surface(s) inclined to the rotor axis or extending approximately normally thereto and provided with crushing or grinding elements or grinding plates, with diameters increasing away from the at least one material feed advantageously directed approximately radially to the rotor axis or approximately tangentially to the rotor jacket or housing shell, as well as optionally, if at least two surfaces, in particular surfaces of revolution inclined to the rotor axis or extending approximately normally thereto and having comminuting elements or the like are provided, those with opposing inclination to the rotor axis and a housing receiving the rotor having corresponding inner wall(s) and opposing crushing or grinding elements or grinding plates arranged thereon, the grinding gaps inclined to the rotor axis advantageously being at least partially variable or adjustable between crushing or grinding elements or grinding plates or the like of the rotor jacket conveniently having surfaces of revolution in particular frustoconical surfaces, and corresponding opposing crushing or grinding elements or grinding plates or the like of the inner housing walls.

Refiners of various types are used for the production of wood pulps, for instance CTMP (chemical thermomechanical pulp), TMP (thermomechanical pulp) and RMP. The high mechanical energy applied causes the generation of high frictional forces in the grinding gap in the known refiners and the defibration of the wood. Large amounts of steam are generated and have to be discharged in the or counter to the direction of flow of the grinding stock.

This steam discharge has two disadvantages: the backflowing steam impedes the feeding of the chips to the refiner because of its large volume, which limits the throughput of the refiner. The pressure in the refiner housing is not freely selectable in order to discharge as much steam as possible in the flowing direction of the grinding stock. For a good utilization of the steam, however, the highest possible pressure is of advantage.

Efforts have therefore been made towards an advantageous discharge of the steam. It is known with two-disk refiners to discharge the steam at the start of the grinding gap. The disadvantage of this embodiment resides in the fact that the steam is not directly separated from the fibrous material in the area in which the main volume of the steam is generated, for the pressure in the actual grinding zone of the refiner is essentially higher than the pressure at the inlet of the chips. In the known method mentioned above, only steam of low tension is present. Since the outlet openings for the steam are slightly inclined towards the center of the axis, in order to separate the steam from the solids, pressure is lost on letting off steam in overcoming the centrifugal forces. As a result, the backflow of steam against the feeding of the chips or the like can only be effectively reduced if the steam is discharged at a very low pressure level, which makes the sensible utilization of the energy content essentially more difficult.

It is the object of the invention to discharge the steam generated during the grinding operation directly from the area of the grinding zone in which steam development is highest and the pressure is also highest. This is achieved according to the invention in an apparatus of the type initially described by providing channels or bores for the discharge of steam spaced from the at least one material feed extending in particular approximately radially to the rotor axis or approximately tangentially to the rotor jacket or housing shell on the crushing or grinding surfaces or grinding plates or the like and optionally on the jacket of the rotor carrying them, said channels or bores piercing the crushing or grinding surfaces or grinding plates or the like and optionally their supports and being provided in the working area of the crushing or grinding elements or grinding plates or the like provided on the surface, conveniently surfaces of revolution, in particular frustoconical surfaces, inclined to the rotor axis or extending approximately normally thereto, on the one hand, and emptying into channels or bores optionally provided in the bottom of said supports and extending approximately normally to said channels or bores, on the other hand, and conveniently being connected to cavities in the housing. This means that channels or bores lead away in the grinding zone from the site where most steam is generated and where the highest steam pressure prevails; it is particularly convenient if channels or bores extending approximately normally to the rotor axis pierce the crushing or grinding surfaces or grinding plates or the like and their support and empty into channels or bores extending approximately normally thereto provided in the bottom of said supports. This brings about a particularly effective discharge of the steam in refiners provided with an engine-driven rotor; the movement of material along the grinding surfaces or the like and the discharge of the steam in the direction of the housing cavities takes place in the same direction; this is enhanced by the rotating movement of the rotor, on the one hand, and by the conical working surfaces or the like widening towards the housing cavities, on the other hand, and the steam discharge channels emptying there as a result of the generated centrifugal forces. According to the embodiment known from DE-AS 23 23 442, the centrifugal forces in the grinding zone act counter to the material flow, this apparatus, by the way, being a disk mill in which the problems are of an entirely different nature. Particularly striking effects in steam discharge can be achieved if the rotor jacket and the corresponding inner housing wall(s) are conveniently formed as surfaces of revolution, in particular as frustoconical surface(s), with a diameter increasing away from the at least one material feed, if the material feed advantageously extends approximately radially to the rotor axis or approximately tangentially to the rotor jacket or housing shell is provided approximately in the center of said housing and the crushing or grinding surfaces or grinding plates or the like extend on the jacket of a drumshaped rotor and correspondingly on the inner housing wall in particular symmetrically, to both sides away from the material feed on the inclined surface, conveniently a surface of revolution, in particular frustoconical surface, with a diameter increasing away from the material feed, the latter enclosing an angle with the rotor axis open to both sides of the front faces of the rotor and crushing or grinding surfaces or grinding plates or the like extending approximately parallel to the rotor axis and in particular directly connected thereto are conveniently provided between the material feed and said crushing or grinding surfaces or grinding plates or the like with increasing diameter, and if the channels or bores pierce the grinding surfaces or grinding plates and optionally the rotor jacket carrying them within the area of the widening surfaces, conveniently surfaces of revolution, in particular frustoconical surfaces, namely, that said channels or bores extend, for instance, in or near the center from the grinding surface to its supports by piercing the grinding plates or the like and emptying into channels or bores in the bottom of the grinding plates or the like or in or at their support(s), said channels or bores being connected to cavities in the housing of the apparatus or refiner. A convenient practical embodiment according to the invention can be so arranged that the crushing or grinding surfaces or grinding plates or the like forming the grinding gaps extending parallel to the axis or extending approximately normally to the axis are arranged symmetrically to the median plane(s) of the, conveniently two or more, radial or tangential material feed(s) advantageously evenly distributed over the circumference of the rotor and steam discharge channels pierce the grinding surfaces or grinding plates or the like or the rotor jacket carrying them transversely to the rotor axis for instance in the area of more than two thirds to three quarters of the path of the grinding stock between the grinding surfaces or grinding plates or the like measured from the entry between said surfaces or plates to its exit into the housing cavities. A particularly effective practical embodiment is obtained if the crushing or grinding surfaces or grinding plates or the like parallel to the axis are followed by the, in particular frustoconical, crushing or grinding surfaces or grinding plates or the like, inclined at an angle of approximately 5 to 45 degrees, in particular 15 degrees, to the rotor axis and for instance the steam discharge channels or bores emptying into the inner grinding surfaces or grinding plates or the like and extending approximately normally to the rotor axis are located approximately in or near the center of said inclined surfaces and in corresponding places of the rotor jacket carrying them. A regulation of the grinding gaps and thus above all a control of the pulp quality and under certain circumstances of the steam control and steam supply may also prove advantageous. This may be achieved according to the invention by providing for the crushing or grinding surfaces or grinding plates or the like to be attached to at least one, conveniently two, supports displaceable or adjustable in the housing, in particular for the outer opposing crushing or grinding surfaces or grinding plates located opposite the mouths of the steam discharge or bores in the working area, to be attached to at least one stator ring, in particular to at least two stator rings which are preferably displaceable independently of one another.

The invention is advantageously applicable if an annular material feed gap connected to an annular space enclosing the outside of the rotor within the housing, into which space the approximately tangential or approximately radial material feed(s) empty, is provided approximately in the cross-axial median plane of the apparatus or its housing between the crushing or grinding surfaces parallel to the axis and thus between those inclined to the rotor axis and provided with steam outlets. For discharging the steam, it is convenient if cavities are provided in the area of the two front walls of the housing in the vicinity of the shaft bearings provided on both sides of the rotor having crushing or grinding surfaces parallel and inclined to the axis and optionally extending approximately normally to the axis, into which cavities the in particular conical or normally extending crushing or grinding gaps and their steam discharge channels or bores empty, said cavities being sealed steam-tight against the two bearings by the special sealing units inserted in the bearing housing between rotor and bearings on the rotor side and conveniently being provided with discharge openings for the comminuted material. A considerable saving in energy can be achieved in the operation of the apparatus according to the invention. If the drumshaped rotor provided on its jacket with crushing or grinding surfaces extending approximately parallel to its axis and on both sides adjacent crushing or grinding surfaces with diameters increasing away from the material feed and connected to steam discharges or provided therewith and optionally with crushing or grinding surfaces extending approximately normally to the rotor axis is supported in sliding bearings by means of the rotary shaft fixedly attached to it and a special starting engine, in particular a direct current engine, is provided for the starting operation and the main engine is designed for an operation at about 3,000 up to 3,600 rpm at full load.

The invention is particularly useful in drum refiners or the like with horizontal rotary axis. But under certain circumstances, it can also be applied advantageously if the rotary axis of the rotor extends vertically.

The invention also relates to a crushing or grinding element for drum refiners for the crushing or grinding of fibrous material with an engine-driven rotor, the element being attachable to the rotor shell, conveniently at least one surface of revolution inclined to the rotor axis or extending approximately normally thereto with a diameter increasing away from the material feed, and provided with crushing or grinding elements, optionally, if at least two surfaces of revolution inclined to the rotor axis or extending approximately normally thereto and having comminuting elements or the like are provided, some of them being of opposing inclination to the rotor axis, the grinding gaps inclined to the rotor axis between the crushing or grinding elements on inner housing walls being at least partially adjustable, with channels or bores for the discharge of steam spaced from the material feed piercing the crushing or grinding surfaces provided on the rotor shell and optionally their supports and the rotor shell itself, one end of said channels or bores being provided in the working areas of the crushing or grinding elements provided on the surfaces of revolution inclined to the rotor axis or extending approximately normally thereto and their other end emptying into channels or bores extending approximately normally to the steam discharge channels or steam discharge bores, and conveniently being connected to cavities in the housing. Crushing or grinding surfaces of this type are subject to wear. This is the case, for instance, when the crushing or grinding surfaces are formed conically. Such surfaces must be repeatedly replaced during the use of such drum refiners in order to assure an adequate crushing or grinding performance.

According to the invention, this object is achieved in a particularly convenient manner by providing for the crushing or grinding element(s) to be formed as cylinder segment(s) provided with anchoring projections of hammerhead-like cross section on the side facing the rotor axis and engageable in corresponding rotor grooves of hammerhead-like cross section, said cylinder segments serving for the discharge of steam.

Segments of this type have two main advantages: On the one hand, it is comparatively simple to slide them into and out of the corresponding rotor grooves, e.g. releasable wedges being used for firm anchoring. On the other hand, it is possible to exchange only individual areas of the crushing or grinding surfaces on the rotor shell and to leave the grinding surface portions of lesser wear with the remaining cylinder segments supporting them on the rotor for further use. In this way, the grinding performance is optimized at simultaneous economical use of the machine parts and additionally enhanced by the convenient steam discharge made possible at the same time.

The patterns of the crushing or grinding surfaces themselves can be formed in any given manner, as ribs, serrations, grooves and ribs or the like.

According to a further development of the invention, ribs of hammerhead-like cross section and contacting two each adjacent segments may be provided on the rotor shell for retaining the cylinder segment(s). A particularly secure seat of the cylinder segments during operation can be achieved if the transition surfaces between the hammer heads and the hammer head stems are planes of which each forms an identical acute angle open to the rotor axis, although of opposing direction, with the plane of symmetry of the hammer heads. This effect may be increased if the lateral flanks of the cylinder segments in the anchored state are disposed in planes radially extending to the rotor axis in the area outside of the hammer heads, with the lateral flanks of adjacent cylinder segments contacting one another.

SUMMARY OF THE INVENTION

Briefly stated, the present invention is a grinding element for a drum refiner for the crushing or grinding of fibrous material. The drum refiner includes an engine driven rotor having a generally horizontal rotor axis and at least one material feed extending generally radially to the rotor axis. A rotor jacket is positioned on the rotor and has a surface of revolution. The grinding element is attached to the rotor jacket on the surface of revolution and has a diameter increasing away from the material feed. A housing is provided for receiving the rotor and rotor jacket therein, and has an opposing inner wall with a corresponding grinding element thereon, such that a grinding gap is formed between the grinding element on the rotor jacket and the grinding element on the inner wall. The grinding gap is at least partially adjustable. The grinding element on the rotor jacket includes a channel spaced from the material feed for the discharge of steam. The channel has one end in fluid communication with the grinding gap and a second end in fluid communication with a bore extending generally normally to the channel. The bore is in fluid communication with a cavity in the housing. The improvement comprises the grinding element on the rotor jacket being generally formed as a segment which includes a surface facing the rotor axis and a surface facing away from the rotor axis. The segment includes an anchoring projection of hammerhead-like cross section extending from the surface facing the rotor axis. The anchoring projection is engageable in a generally corresponding rotor groove of hammerhead-like cross section in the surface of revolution, such that the segment serves for the discharge of steam and is locked to the rotor jacket.

BRIEF DESCRIPTION OF THE DRAWINGS

The foregoing summary, as well as the following detailed description, is better understood when read in conjunction with the appended drawings. For the purpose of illustrating the invention, embodiments which are presently preferred are shown in the drawings. It is understood, however, that this invention is not limited to the precise arrangements and instrumentalities shown. In the drawings.

DETAILED DESCRIPTION OF PREFERRED EMBODIMENT

Figure 1:
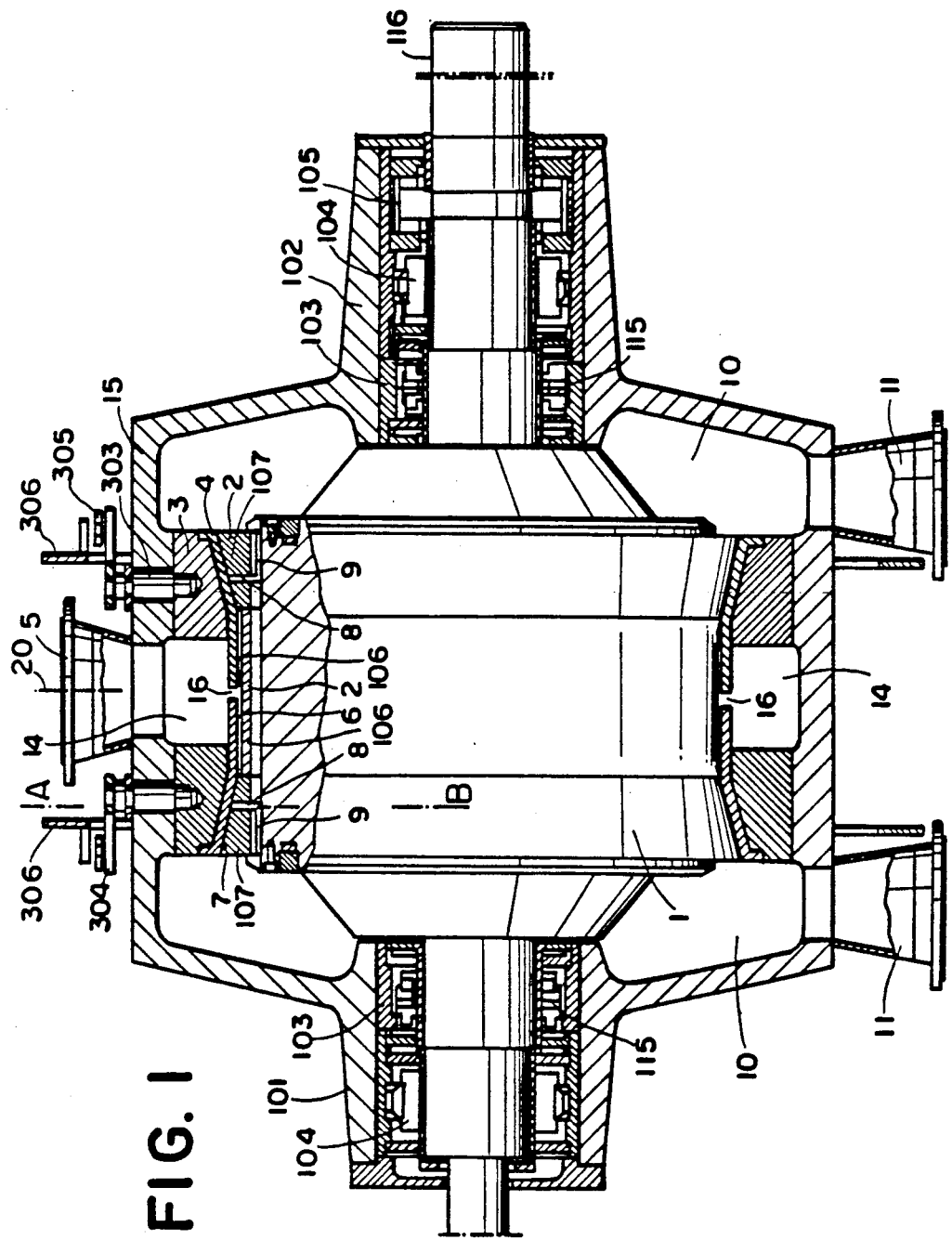
FIG. 1 is a front elevational view, partially in cross section, of an apparatus for crushing or grinding fibrous material in accordance with the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the drum refiner and designated parts thereof. The terminology includes the words above specifically mentioned, derivatives thereof and words of similar import.

Figure 2:
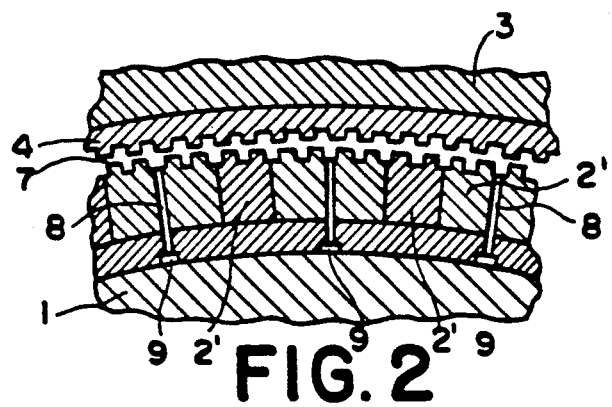
FIG. 2 is an enlarged cross-sectional view, schematically showing a portion of the grinding element of the apparatus for grinding or crushing material of FIG. 1 taken along lines A-B of FIG. 1.
Figure 3:
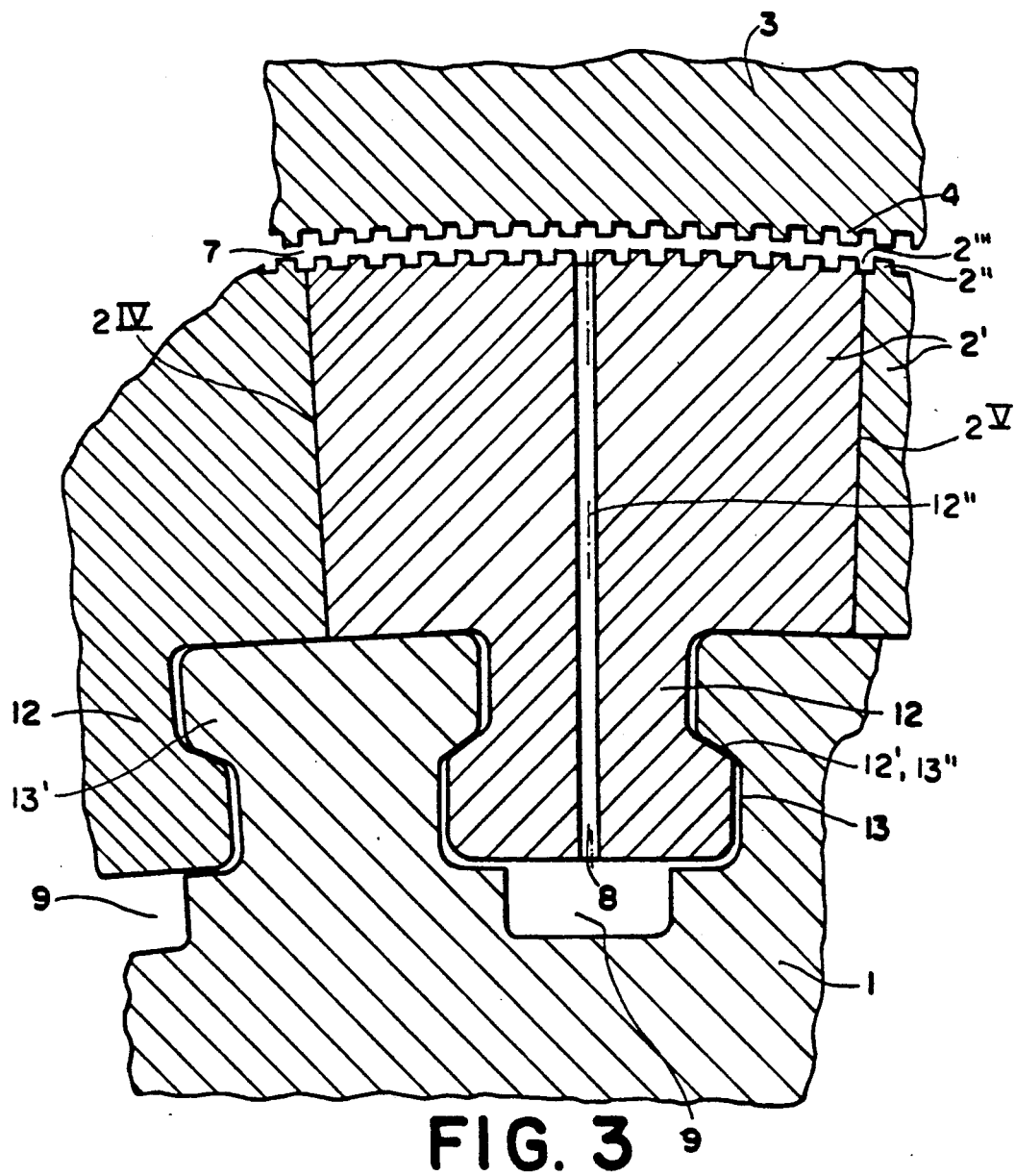
FIG. 3 is a greatly enlarged view of the portion of the grinding element shown in FIG. 2.

Referring to the drawings in detail, wherein like numerals indicate like elements throughout, there is shown in FIGS. 1-3 a first preferred embodiment of a grinding element for a drum refiner for the crushing or grinding of fibrous material.

The drum refiner shown is provided with a cylindrical, bilaterally supported rotor 1 on which grinding plates 2 are attached by means of which the grinding zone at first extends parallel to the axis and is then slightly inclined to the horizontal. Opposing grinding plates 4 are provided on stator rings 3 adjustable in the horizontal direction. The chips are fed to the refiner via conveyor screws in the radially directed material feed(s) 5 of which two or more are evenly distributed over the circumference of the drum refiner; the chips are distributed to both sides in the precrushing zone 6 extending parallel to the axis and are essentially defibrated in the grinding zone 7 inclined to the rotor axis. From said zone 7, channels 8 lead vertically toward the rotor axis to (a) collecting channel(s) 9. Through this channel system, the steam is passed to a cavity 10 of the refiner housing from where it exits together with the fibrous material at 11 and is passed to a pressure cyclone downstream for heat recovery and discharge. Identical or similar channels 8, 9 are conveniently also provided on both sides of the rotor.

According to the invention, the grinding plates 2 are composed of segments 2' (FIG. 2). An embodiment of dimensions particularly adapted to practical use is shown in FIG. 3. Anchoring projections 12 in corresponding rotor grooves 13 of hammerhead-like cross section are provided for the individual grinding plate segments 2'. In this case, the crushing or grinding segment(s) 2' is (are) provided with ribs 2'' or grooves 2''', extending approximately parallel to the rotor axis on the surface facing away from the rotor axis for forming the crushing or grinding surface on the rotor 1. In addition, ribs 13' of hammerhead-like cross section contacting two each adjacent segments 2' are provided on the rotor shell for retaining the cylinder segment(s) 2'. The anchoring of the segments is particularly convenient if the transition surface 12', 13'' between the hammer heads and the hammer head stems are planes each of which forms an identical acute angle open towards the rotor axis, but of opposing direction, with the plane of symmetry 12'' of the hammer heads. This is further improved if in the anchored state, the lateral flanks $2^{IV}$, $2^{V}$ of the cylinder segments 2' are disposed in planes radially extending to the rotor axis in the area outside of the hammer heads 12, with the lateral flanks of adjacent cylinder segments contacting one another. The remaining corresponding parts of this representation are provided with the same reference number as those used in FIGS. 1 and 2.

The advantage of the invention resides in the fact that the steam is discharged directly at the site of its generation and thus at the highest possible pressure. A backflow of steam and thus an impediment of the feeding of chips or the like is largely prevented thereby. By the channels 8 extending normally to the rotor axis, a good discharge of steam and optionally its separation from the solids is obtained and a clogging of the channels is prevented. The good discharge of the steam not only permits a recovery of the steam at the highest possible pressure, but also—in relation to the available grinding surface—a higher specific use of energy.

Figure 4:
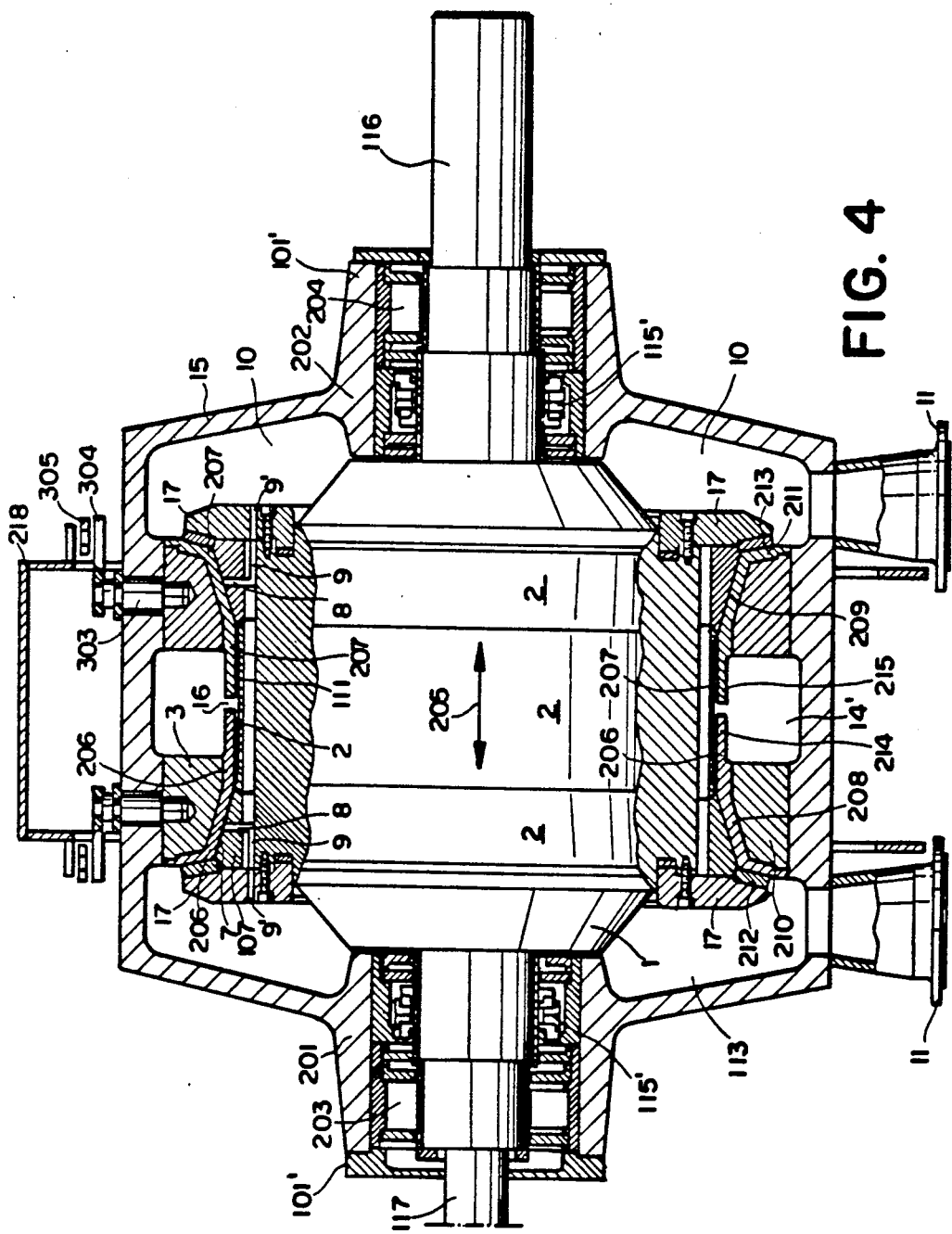
FIG. 4 is a front elevational view, partially in cross section, of an apparatus for crushing or grinding material in accordance with an alternate embodiment of the invention.
Figure 5:
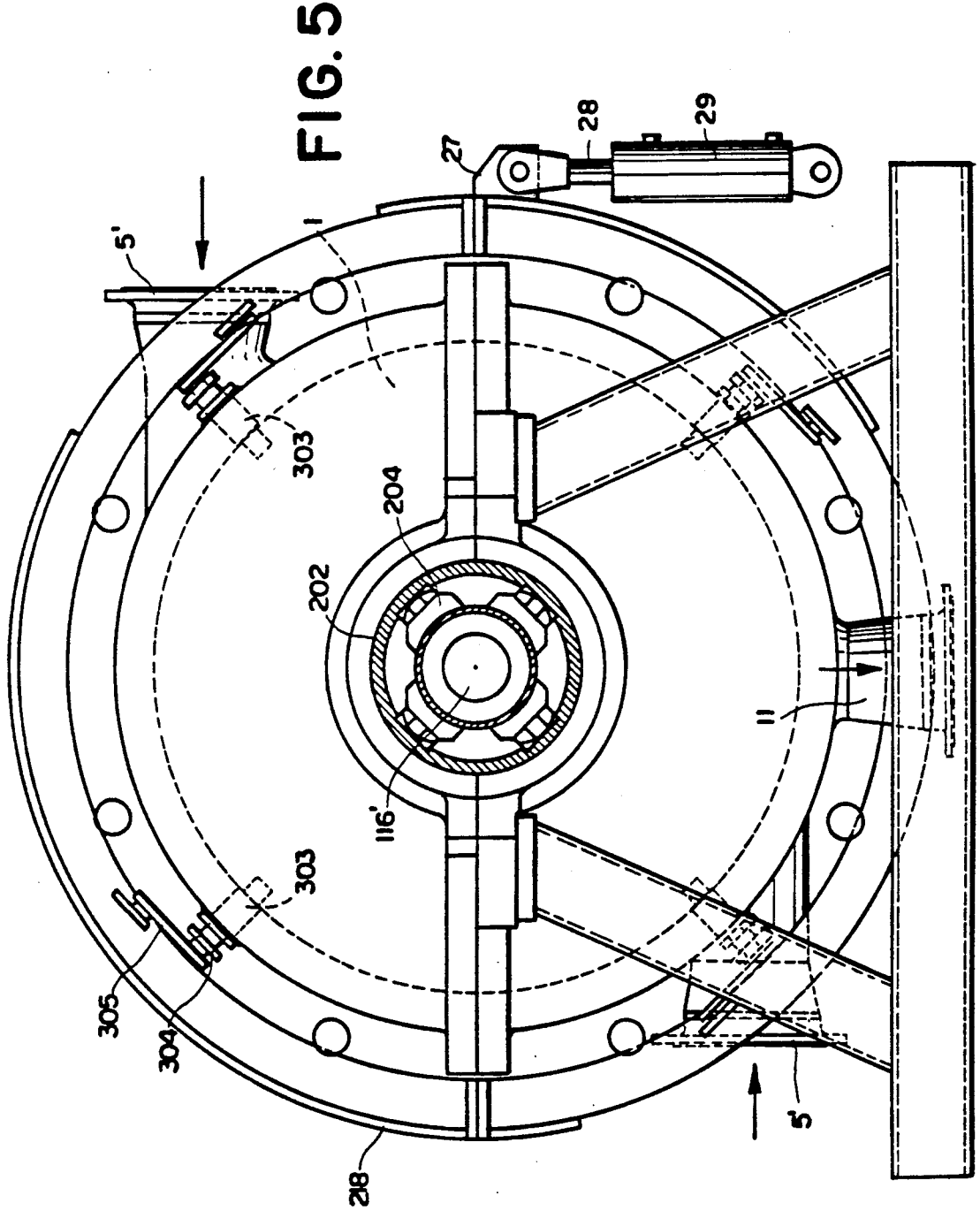
FIG. 5 is a side elevational view, in partial cross section, of the apparatus for crushing and grinding material shown in FIG. 4.
Figure 6:
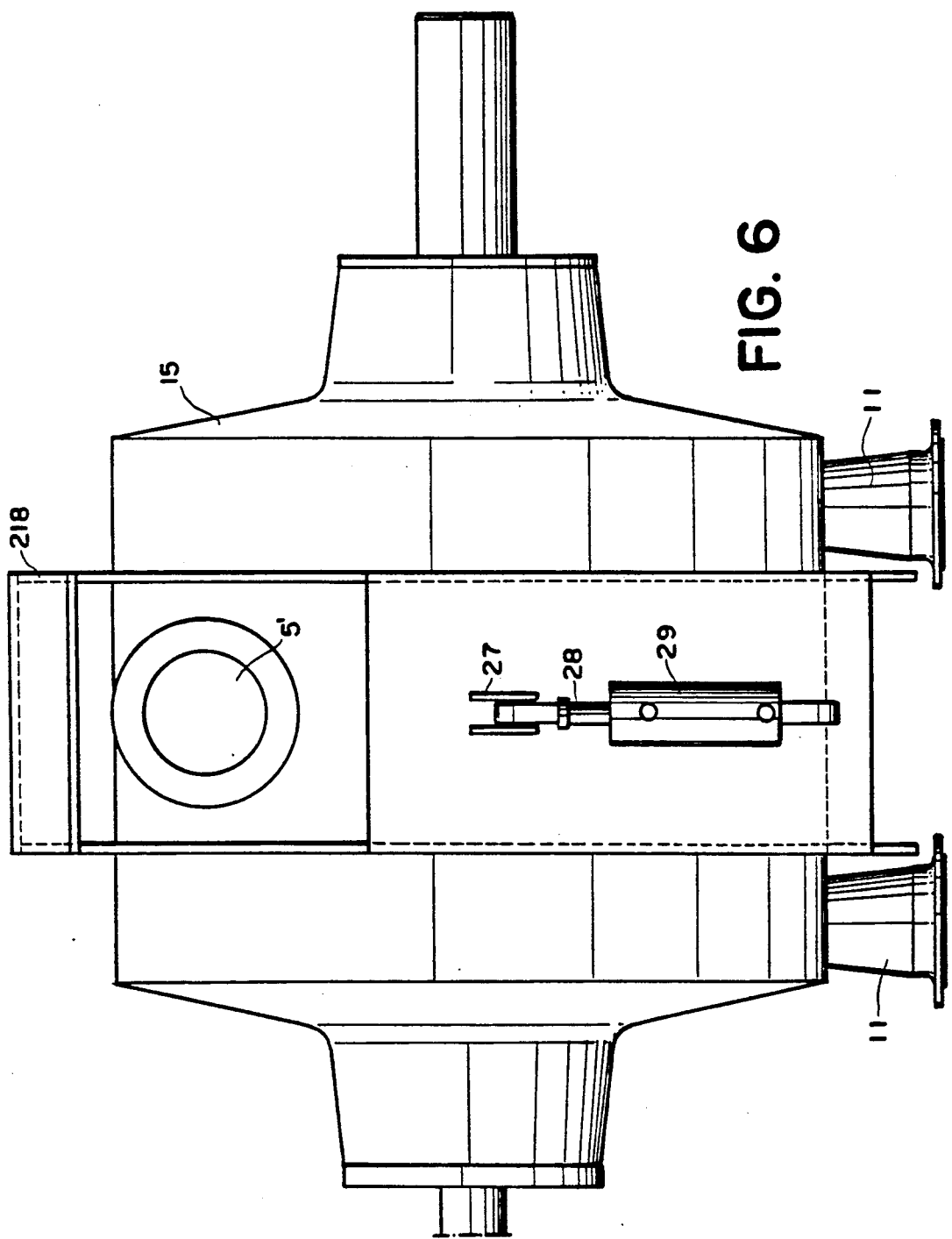
FIG. 6 is a front elevational view of the apparatus for crushing and grinding material shown in FIG. 4.

The variant according to FIGS. 4 to 6 shows, as briefly mentioned before, an apparatus with material feeds 5' extending approximately tangentially to the rotor 1 (FIGS. 5, 6). In the presentations of FIGS. 4 to 6, identical components or parts of the apparatus corresponding to the variants according to FIGS. 1 to 3 are provided with identical reference numbers.

In the embodiment according to FIGS. 1 to 3 as well as in that according to FIGS. 4 to 6, the material to be comminuted is conveyed from the radial or tangential material feeds 5 or 5' into an annular space 14 or 14' enclosing the outside of the rotor 1 within the housing 15 of the apparatus. This annular space 14 is connected on the inside to an annular material feed gap 16 provided in the cross-axial median plane of the apparatus or its housing between the crushing or grinding zones 6 parallel to the axis and thus between the crushing or grinding zones 7 inclined to the rotor axis.

The steam discharges 8, 9 are formed in the variant according to FIGS. 4 to 6 similarly to FIGS. 1 to 3, although the collecting channels 9 are made to pass by means of extension channels 9' through supporting rings 17 connected to the rotor 1, which rings 17 carry grinding plates 2!2, 213 at an angle of nearly 90 degrees with the rotor axis. Said grinding plates 212, 213 cooperate with opposing grinding plate extensions 210, 211 attached to the stator rings 3 and forming approximately identical angles with the rotor axis as the grinding plates 212, 213.

The apparatus previously described are of similar construction as far as the remaining components are concerned: in the preferably horizontally divided refiner housing 15, the cylindrical rotor 1 is bilaterally supported in bearings 101, 102 or 101', rolling bearings, sliding bearings or sliding bearings with tilting segments being used depending on diameter, capacity and number of revolutions per minute. In the representation of FIG. 1, the rotor shaft ends are secured against axial displacement and supported in the bearing parts 103, 104 or 105 of the bearings 101, 102. In the embodiment according to FIGS. 4 to 6, a floating support described in detail later on is provided. On the rotor 1, grinding plates 106 are attached in zone 6 and grinding plates 107 are attached in zone 7, the grinding plates 106 arranged along a cylindrical part of the jacket serving for precrushing of the chips and the grinding plates 107 forming an angle with the rotor axis serving for defibration. By the shape of the grinding plates 107, an inclination of the grinding zone to the horizontal of between 5 and 45 degrees, preferably 15 degrees, is achieved. The additional grinding plates of steeper inclination to the rotor axis shown in FIG. 4 will be described later on.

The axially displaceable stator rings 3 provided with the opposing grinding plates 4 are radially engaged by a plurality of eccentric bolts 303 distributed over the circumference and exactly fixing the stator ring 3 in the desired position axially as well as radially. The stator ring(s) 3 thus do(es) not have to be guided on the outer jacket and can have movement in respect of the housing 15.

In order to adjust the grinding gap, the eccentric bolt 303 can be rotated via a lever 304 positively attached thereon and a guide bar 305 connected thereto, whereby, as shown in FIG. 1, all the guide bars of a stator ring are exactly and uniformly adjusted by a control ring 306 hydraulically or mechanically actuated for instance by means of the adjusting mechanism. A simultaneous adjustment of both stator rings is described later on under reference to FIGS. 4 to 6.

The control rings 306 are—adapted to the housing—preferably composed of two parts and carried by suitable roll bodies connected to the housing. The arrangement of the control rings 306 is concentric to the stator ring 3 and preferably above the pivoting range of the levers 304.

As a result of the symmetrical arrangement of the stator rings 3, the adjusting means is also arranged symmetrically to the median line 20; the two control rings 306 are adjustable independently of one another in order to compensate for differences in the dimension of the grinding gap on both sides, for instance as the result of uneven thermal expansion of housing and rotor.

In the embodiment according in FIGS. 1 to 3, the chips are fed radially via one to four material feed(s) 5 with openings on the circumference. As mentioned previously, the chips are precrushed in the horizontal grinding zone 6 and distributed symmetrically in both directions. The defibration of the wood is effected in the grinding zone 7 inclined to the horizontal. The grinding stock is conveyed from there to the inner space 10 of the refiner housing and is discharged at 11 together with the generated steam.

The bearings are sealed against the steam in the refiner housing by means of sealing units 115. On the free shaft end 116, an engine, preferably a direct current engine, of essentially lower output than the main engine, can be installed in order to reduce the starting current peak. By this embodiment modified in comparison to known refiners, the refiner according to the invention can be operated at 3,000 to 3,600 rpm.

The invention can also be used advantageously in refiners with vertically extending rotor shaft. The comminuting of fibrous materials other than wood and under certain circumstances even of leather scraps is possible, water or other liquids optionally being added to the precrushed material. The following effects and advantages in refiners or the like can be achieved: a guidance and centering of the outer grinding plate support(s) in the form of (a) stator ring(s) by means of radial eccentric bolts distributed over the circumference and a controlled axial displacement of the stator ring(s) by means of eccentric bolts, lever, guide bars and control ring(s). An additional advantage is a concentric arrangement of the control ring(s) in relation to the stator ring(s), said control rings enclosing the housing. In this case, a symmetrical embodiment of the adjusting means for the two stator rings is of great advantage. The adjustment of one control ring causes the uniform rotation of all the eccentric bolts connected to the same control ring and thus an exact axial displacement of the associated stator ring without jamming or the like occurring. This brings about a favorable power-distance-transmission. Due to the separate control rings for the individual stator rings, a particular control of the grinding gap, its shape and dimension is possible. Complicated hydraulic adjusting devices are thus avoided.

The embodiment according to FIGS. 4 to 6 differs from the one previously described mainly by the type of material feed, the special support of the rotor and the modified stator adjustment.

The material feed takes place only at 5' in this case in two places approximately tangentially to the rotor 1 into the annular space 14' from which the material is conveyed to the grinding plates or the like. The shaft ends 116, 117 of the rotor 1 and thus the rotor itself are supported floatingly in this case. For this purpose, hydrostatic sliding bearings 203 and 204 are provided in the bearings 201 and 202. The bearings are again sealed against the steam in the refiner housing by means of sealing units 115'. The double arrow 205 indicates the possible rotor movement and floating rotor support made possible by the aforementioned support of the rotor. Even if the adjustment of only one stator were sufficient in this case, the adjustment of both stators 3 and thus of the opposing grinding plates or the like 206, 207 attached to them is also possible; these grinding plates or the like, as already mentioned, are provided with parts 210, 211 in addition to the frustoconical parts 208, 209, the parts 210, 211 forming a larger angle, namely one of nearly 90 degrees, with the rotor axis than the parts 208, 209. As mentioned previously, additional grinding plates 212, 213 cooperate with the parts 210, 211 and extend just as steeply to the rotor axis as the parts 210, 211 and are supported by special rings 17 connected to the rotor 1.

The adjustment of the stators 3 and thus of the opposing grinding plates or the like 206 to 211, but also of the cylindrically formed opposing grinding plates 214, 215 is effected in a manner similar to that shown in FIGS. 1 to 3 via the parts 303 to 305, although in this case simultaneously and in opposing direction via curved hoops 218 which are uniformly displaced by means the adjusting mechanism 27 to 29. In view of the floatingly supported rotor, the adjustment of only one stator would be conceivable in this case. The second stator would then be rigidly supported in the housing. The mobility for the grinding gap adjustment is assured by the free axial displaceability (floating support) of the rotor.

From the foregoing description, it can be seen that the present invention comprises a grinding element for a drum refiner for the crushing or grinding of fibrous material. It is recognized by those skilled in the art, that changes may be made to the above-described embodiments of the invention without departing from the broad inventive concepts thereof. It is understood, therefore, that this invention is not limited to the particular embodiments disclosed, but is intended to cover all modifications which are within the spirit and scope of the invention as defined by the appended claims.

We claim:

1. A grinding element for a drum refiner for the crushing or grinding of fibrous material including an engine-driven motor having a generally horizontal rotor axis, at least one material feed, a rotor jacket positioned on said rotor and having a surface of revolution, the grinding element being attachable to the rotor jacket on said surface of revolution and having a diameter increasing away from the material feed, a housing for receiving the rotor and rotor jacket therein and having an opposing inner wall with a corresponding grinding element on said rotor jacket and the grinding element on said inner wall, the grinding gap being at least partially adjustable, said grinding element on said rotor jacket including a channel spaced from the material feed for the discharge of steam, said channel having one end in fluid communication with said grinding gap and a second end in fluid communication with a bore extending generally normally to the channel, said bore being in fluid communication with a cavity in the housing, the improvement comprising said grinding element on said rotor jacket being generally formed as a segment and including a surface facing the rotor axis and a surface facing away from the rotor axis, the surface facing away from the rotor axis being shaped or curved as a part of the outer surface of the rotor jacket, said segment including an anchoring projection of generally hammerhead shape in cross section extending from said surface facing the rotor axis, said anchoring projection being engagable in a generally corresponding rotor groove of general hammerhead shape in cross section in said surface of revolution, the anchoring projection of general hammerhead shape in cross section and the groove of general hammerhead shape in cross section each include a hammerhead portion and a hammerhead stem portion with transition surfaces therebetween, the transition surfaces lying in a plane which forms an angle with respect to the rotor axis, said anchoring projection serves for the discharge of steam and is locked to said rotor jacket.

2. The grinding element according to claim 1, wherein the segment further includes ribs on the surface facing away from the rotor axis for forming a grinding surface on the rotor.

3. The grinding element according to claim 2, wherein the surface of revolution includes rotor grooves which form ribs of general hammerhead shape in cross section, and wherein the grinding element is comprised of a plurality of segments positioned on said rotor jacket, such that each of said ribs contacts two adjacent segments for retaining the segments on the rotor jacket.

4. The grinding element according to claim 3, wherein the segment includes a pair of lateral flanks disposed in an area outside of the anchoring projection in planes extending generally radially to the rotor axis, said grinding element being comprised of a plurality of segments positioned on said rotor jacket, such that the lateral flanks of the segments contact one another.

5. The grinding element according to claim 2, wherein the transition surface lie in a plane which forms an identical acute angle open to the rotor axis, but of opposing direction, with a plane of symmetry of the hammerheads.

6. The grinding element according to claim 2, wherein the segment includes a pair of lateral flanks disposed in an area outside of the anchoring projection in planes extending generally radially to the rotor axis, said grinding element being comprised of a plurality of segments positioned on said rotor jacket, such that the lateral flanks of the segments contact one another.

7. The grinding element according to claim 1, wherein the surface of revolution includes a plurality of rotor grooves which form ribs of general hammerhead shape in cross section, and wherein the grinding element is comprised of a plurality of segments positioned on said rotor jacket, such that each of said ribs contacts two adjacent segments for retaining the segments on the rotor jacket.

8. The grinding element according to claim 7, wherein the transition surfaces lie in a plane which forms an identical acute angle open to the rotor axis, but of opposing direction, with a plane of symmetry of the hammerheads.

9. The grinding element according to claim 7, wherein the segment includes a pair of lateral flanks disposed in an area outside of the anchoring projection in planes extending generally radially to the rotor axis, said grinding element being comprised of a plurality of segments positioned on said rotor jacket, such that the lateral flanks of the segments contact one another.

10. The grinding element according to claim 1, wherein the transition surfaces lie in a plane which forms an identical acute angle open to the rotor axis, but of opposing direction, with a plane of symmetry of the hammerheads.

11. The grinding element according to claim 1, wherein the segment includes a pair of lateral flanks disposed in an area outside of the anchoring projection in planes extending generally radially to the rotor axis, said grinding element being comprised of a plurality of segments positioned on said rotor jacket, such that the lateral flanks of the segments contact one another.

* * * * *